United States Patent [19]

Ingemann

[11] Patent Number: 4,529,100

[45] Date of Patent: Jul. 16, 1985

[54] CONTAINER AND SEALED CLOSURE MEANS

[75] Inventor: Ole Ingemann, Ryslinge, Denmark

[73] Assignee: A/S Haustrup Plastic, Langeskov, Denmark

[21] Appl. No.: 591,443

[22] Filed: Mar. 20, 1984

[30] Foreign Application Priority Data

Mar. 22, 1983 [SE] Sweden .................................. 8301542

[51] Int. Cl.³ ............................................. B65D 41/00
[52] U.S. Cl. ................................... 220/359; 220/270; 220/276
[58] Field of Search ................ 220/270, 276, 359, 266

[56] References Cited

U.S. PATENT DOCUMENTS 3,318,477  5/1967  Southwick, Jr. et al. .......... 220/276
4,433,793  2/1984  Ingemann ........................... 220/270

Primary Examiner—George T. Hall
Attorney, Agent, or Firm—Roberts, Spiecens & Cohen

[57] ABSTRACT

A container comprising a lid and a container body with a flange, the lid and the flange being fixed to one another in an originally sealed condition of the container to provide a tight closure of the container by a frame-like connection member which has first and second attachment sections affixed to the flange and to the lid respectively. A weakening zone is disposed between the two attachment sections in addition to a downwardly projecting flange. When the container is resealed the outer surface of the flange sealingly abuts against the inner surface of the wall of the container at its mouth. The walls of the container, lid and connected member can be provided with layers of high-barrier material.

26 Claims, 51 Drawing Figures

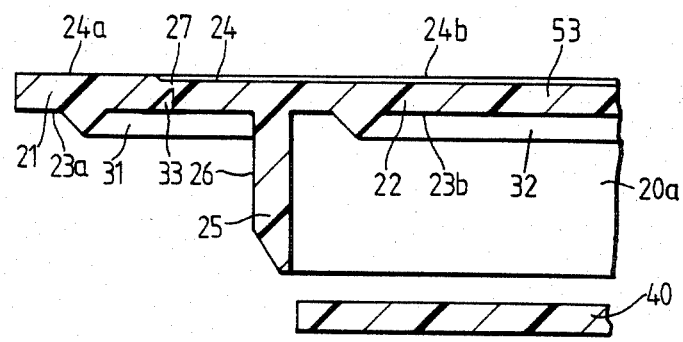
*Fig. 2a.*
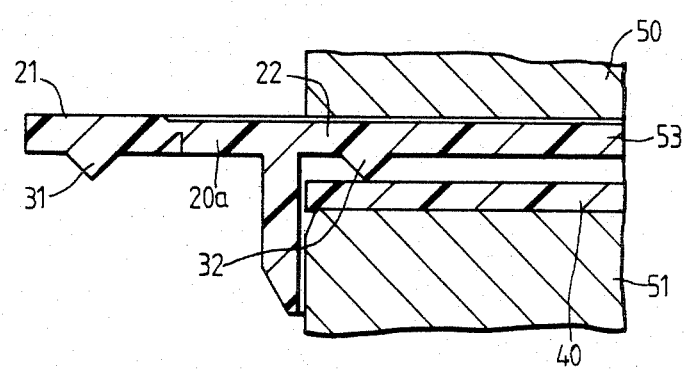
*Fig. 2b.*
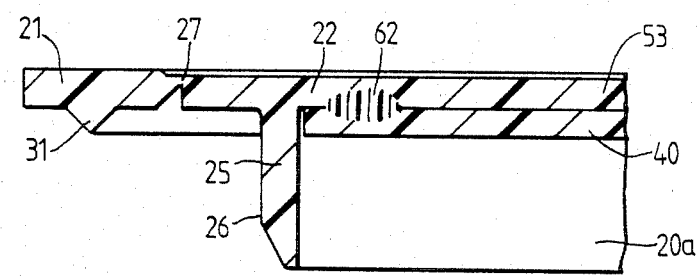
*Fig. 2c.*
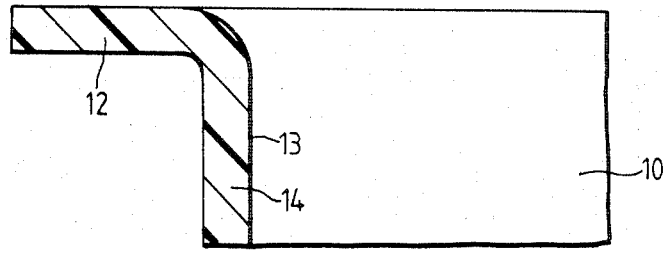

CONTAINER AND SEALED CLOSURE MEANS

FIELD OF THE INVENTION

The present invention relates to a container comprising a container body and a lid, whereby both the container body and the lid consist primarily of thermoplastic material, and more specifically to disposing to container with a frame-like device that comprises a connection device between the lid and the container body of the originally sealed container.

PRIOR ART

Many applications require a hermetic connection between the lid and container body in an originally sealed container. Combinations of a container body and a lid have previously also been known, where the lid is affixed to the container body by means of a welding procedure, e.g. by means of ultrasonic welding. Such solutions are described in the patent documents U.S. Pat. No. 4,207,989 and U.S. Pat. No. 4,332,332. The latter show how the container body is disposed with an upper flange for engagement with a corresponding flange in the lid. The flange of either the container body or the lid is thereby disposed with a weld indication that forms a start region for affixing the container body to the lid. Particularly in the application of thermoforming technology there are however certain problems in making the weld indication so distinct that the desired degree of the surface pressure is obtained during the welding process. The surface pressure is necessary in order to ensure that a continuous and tight welded joint is formed, which is, in turn, a prerequisite for the required hermetic connection between the container body and the lid. Since thermoforming technology is superior from the point of view of cost, among other factors, in the mass production of containers, there is considerable requirement for a technology that combines the advantages of thermoforming with the necessary distinct shaping of the weld indication.

It is very common that containers which include high-barrier material are produced with the application of thermoforming technology. Co-extruded films are thus moulded into containers that are more or less stable in shape. Such containers are known which are originally sealed by heat sealing e.g. welding or glueing (e.g. hot melt) or ultrasonic welding. In heat sealing it is necessary that the wall thickness of either the lid or container body is very small in order to provide required heat conduction to the joining region.

Previously known containers of high-barrier material are usually opened by a tool e.g. a knife, whereby the lid is deformed during opening and cannot be used to reseal the container. Moreover, none of the known containers with high-barrier properties are provided with a lid for resealing after a first opening.

SUMMARY OF THE INVENTION

The present invention provides a solution to the above problems and eliminates the above disadvantages. In accordance with the invention, a container body is disposed with an outwards-facing flange against which the original closure of the container takes place in that a frame-like connection device has a first frame section, hereinafter also named first attachment section, which runs all the way round, said section being adapted for attachment to the flange and a second frame section, hereinafter also named second attachment section, which runs all the way round, said second section being adapted for attachment to the lid, whereby the frame-like device forms a connection device between the container body and the lid. Hereafter the frame-like connection device will be simply referred to as the connection device. In the vicinity of each attachment section the connection device is, in a preferred embodiment, disposed with one or more weld indications in which during the original sealing of the container welded joints are initiated between the connection device and the flange of the container body, and between the device and the lid, respectively. The weld indications are thereby disposed on attachment sections of the connection device, on the flange of the container body and/or on the lid.

The utilization of a separate device as a connection device between the container body and the lid allows great freedom in the design of the container body, connection device and lid as well as the mutual contact surfaces therebetween both prior to the original sealing and after it. This construction thus makes it possible to give the contact surfaces an optimal design in order to obtain a tight and reliable resealing, which in certain embodiments also includes a snap function. In these embodiments of the invention where the opening of the originally sealed container takes place by means of a rip-open procedure the container has a weakening zone. When the weakening zone is disposed in the connection device it is located in a region between the two attachment sections.

In a preferred embodiment, the connection device is disposed with a flange facing downwards from the under-side of the device, with the outer limitation surface of the flange fitting tightly against an inner orifice surface of the mouth wall of the container body when the container is sealed.

In the embodiment of the invention where a weakening zone is disposed in a region between the first attachment section and the second attachment section, the two attachment sections are freed from one another in conjunction with the opening of the container and form after opening parts of the orifice section of the container and of the lid, respectively.

In yet another preferred embodiment, the two attachment sections of the connection device are displaced relative to one another both axially and in relation to the central axis of the connection device, whereby a downward-facing material portion is disposed in the transition between the two attachment sections. The downward-facing material portion forms an acute angle with the axis of the connection device, in addition to which the second attachment part is preferably located at a lower level than the first attachment section. The lid is as a rule disposed with an upward-facing flange which encloses the lower part of the downward-facing material portion and forms an acute, preferably somewhat larger angle with the axis of the container (connection device) than the downward-facing material portion. The lid is furthermore so disposed that when the container body is not sealed the upward-facing flange of the lid has a maximum circumference somewhat larger than the circumference of the inner orifice surface of the container body. With the lid placed in the container the upward-facing flange thus resiliently abuts against the inner orifice surface and thus forms an effective seal thereagainst. This embodiment also equalizes any dimensional deviations in the container body and thereby reduces the need for precision in the production of the container body, connection section and lid.

The embodiments described above are supplimented in certain applications by an oblique material portion in the container body in the transition between the primarily vertical orifice section of the orifice and the outward-facing flange of the container body. The weakening zone of the connection device is thereby disposed in a region above the oblique material portion, by which means in the case of a resealed container the lid occupies a position closer to the bottom of the container than in the originally sealed container. The alteration in position indicates that an originally sealed container has been opened and then resealed.

In yet embodiment, the lid is disposed with a primarily vertical wall portion which in a sealed container fits tightly against the downward-facing flange of the connection device. The weakening zone is disposed in the connection device and outside the region for its affixing to the downward-facing flange (orifice flange) of the container body. When an originally sealed container is opened the lid is separated by its vertical portion from the part of the connection device which is affixed to the container body, and thus also from the downward-facing flange of the connection device. In the resealing of the container the vertical portion of the lid abuts the downward-facing flange of the connection device sealingly.

In yet another embodiment where a snap function is sought, the container is disposed with a lid which has a primarily vertical wall portion which is disposed in its lower section with a bulge. In the case of the originally sealed and resealed container the bulge snaps in below the downward-facing flange of the connection device to achieve the desired snapping function.

In yet another embodiment of the invention the orifice section of the container body is disposed outwards in relation with the wall of the container body located thereunder in a region closest to the outward-facing flange of the container body. By this means there is formed an internal ledge just below the orifice flange of the container body. The lid has a cup-shaped contour and is joined to the connection device so that the lid either turns its edge upwards or downwards in the originaly sealed container. The weakening zone of the connection device is disposed outside the edge of the lid. Furthermore, the lid has a shape adapted to the shape of and/or the location of the aforementioned ledge, whereby the lid rests against the ledge both in the case of an originally sealed container and a resealed container. Especially in the case of an originally sealed container, this ensures securityagainst undesired opening in the event of downward-acting forces on the central portion of the lid, e.g. when a number of containers are stacked on each other during transportation, in storage etc.

In those embodiments where the connection device and the lid have mutual positions causing the connection device to form an outer delineation for the combination of the connection device/lid in the originally sealed container, the connection device is provided with a special gripping device. The gripping device is located close to the weakening zone of the connection device and the opening forces are primarily absorbed solely by the material in the connection device which on acount of its other functions is already of relatively sturdy dimension. The choice of material and the dimensions of the lid can thus as a rule be undertaken independently of the stresses that arise in opening the container.

The invention is especially suited for being used for embodiments where a container body and/or lid is thermoformed from a laminate containing high-barrier material. The combination of a container body, connection device and lid is thereby executed in accordance with one of the aforementioned examples. The barrier layers thereby enclose primarily the entire cavity which is formed in a closed container. In those regions which lack a barrier layer the distances between the inner and outer surfaces of the container are especially great, which makes it possible to achieve the desired barrier properties of the container. By coating e.g. those sides of the connection device which do not have any contact with the contents of the container with special barrier layers the barrier properties of the closed container can be further improved.

BRIEF DESCRIPTION OF THE DRAWINGS

The invention is described in greater detail in conjunction with a number of figures, showing axial partial sections through the orifice regions of containers in various embodiments of the invention, where FIGS. 2*a–j* show an embodiment where the downward-facing flange of the connection device is located between both attachment sections of the connection device.

DETAILED DESCRIPTION OF PREFERRED EMBODIMENTS

Figure 1A:
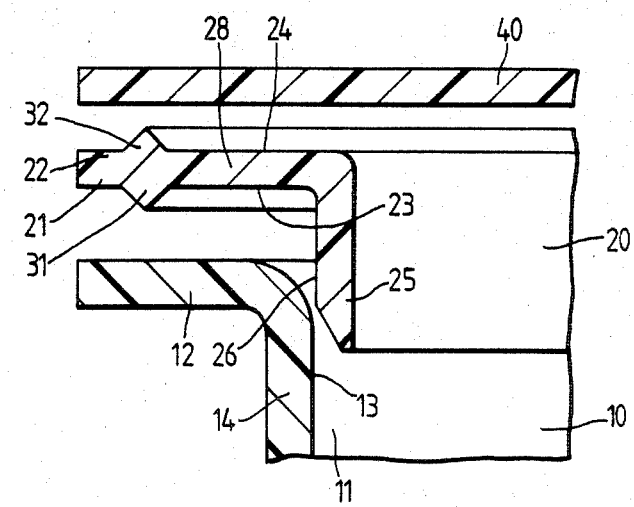
FIGS. 1*a–i* show an embodiment where the connection device has a downward-facing flange delineating the inner periphery of the connection device.

Figures 1*a–i* disclose an embodiment comprising a lid 40 designed as a primarily flat disc, a container body 10 with an orifice section 11 whose orifice wall 14 in its upper section is terminated by an outward-facing flange 12. A frame-like connection device 20 (hereinafter generally designated connection device) is disposed with a flange 28, which runs all the may round and with an outer circumference corresponding primarily to the circumference of the outward-facing flange 12 of the container body, the lower material region of said flange forming a first attachment section 21 and the upper material region forming a second attachment section 22 for engagement with the flange 12 and the lid 40, respectively. The first attachment section has a lower surface 23 disposed with a weld indication 31 and the second attachment section has an upper surface 24 disposed with a weld indication 32. The central opening of the connection device is delineated by a downward-facing flange 25 whose outer circumference and shape correspond primarily to the circumference and shape of the inner orifice surface 13 of the orifice section.

Figure 1B:
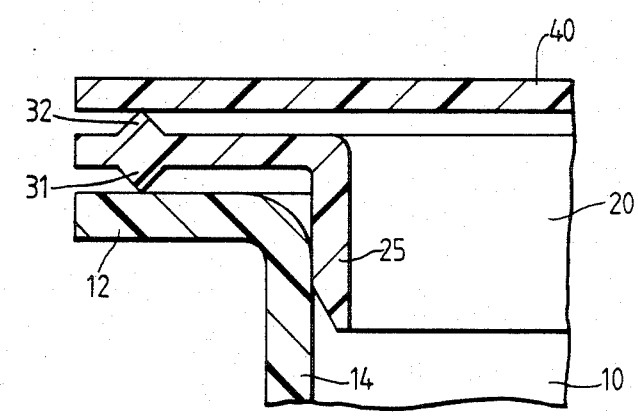
Figure 1C:
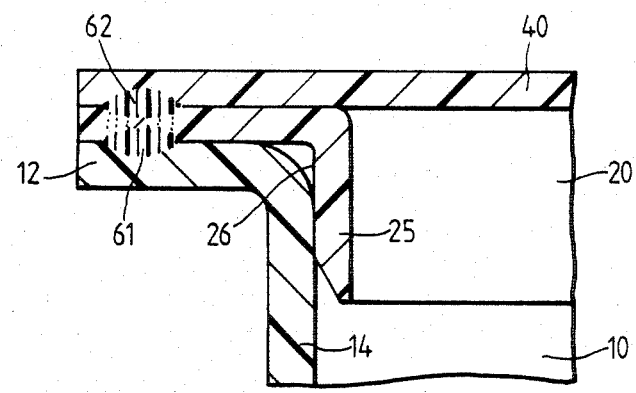
Figure 1D:
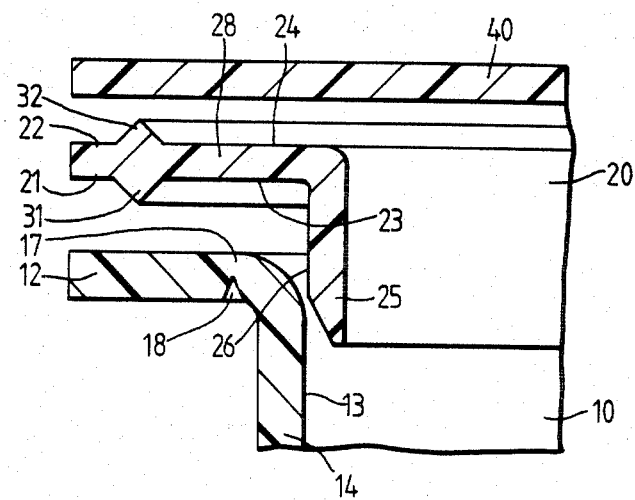
Figure 1E:
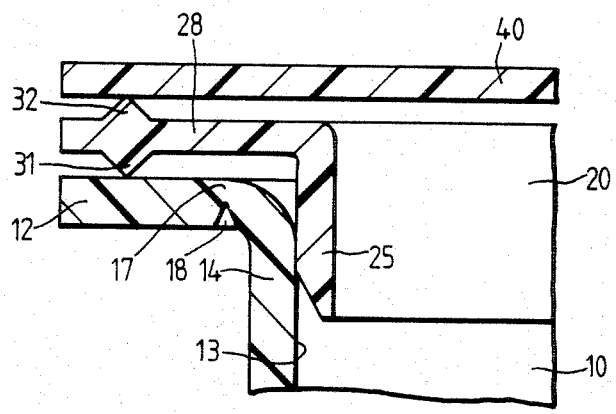

FIG. 1a shows the lid 40, the connection device 20 and the container body 10 separated from each other, while FIG. 1b shows said parts in abutment against each other. The weld indications 32, 31 thus assume a position where they abut the lid 40 and the flange 12 of the container body respectively. When ultrasonic vibrations are applied to the region, e.g. by means of a so-called sonotrode during simultaneous compression of the lid and flange against one another, the lid 40, the connection device 20 and the flange 12 (cf FIG. 1c) are welded together, commencing in the weld indications whereby a weld joint 62 is formed between the lid and the connection device and a weld joint 61 between the flange and the connection device.

In certain embodiments there is disposed as shown in the FIGS. 1d–h a weakening zone 17 in the container body in order to facilitate opening of the originally sealed container. The weakening zone is formed preferably by means of a thinning of material achieved by means of a groove 18 which as a rule is only formed in one of the delineation surfaces of the container body. In the embodiment shown the groove is disposed in the outer surface of the container body and in a region within the region of the flange 12 in which the joining together of the connection device 20 and the flange 12 takes place. The weakening zone is in some embodiments disposed as material regions of lower strength, e.g. achieved by means of material crystallization.

Figure 1F:
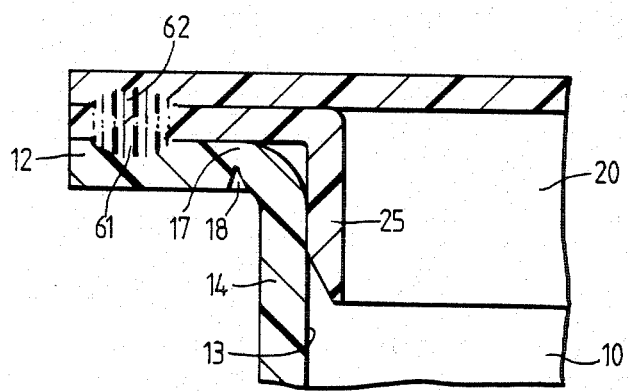
Figure 1G:
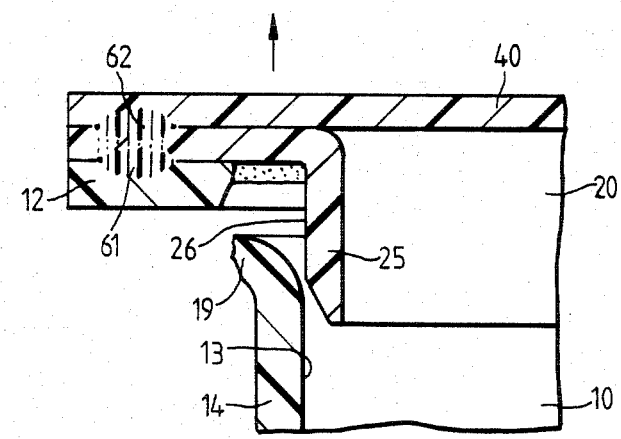
Figure 1H:
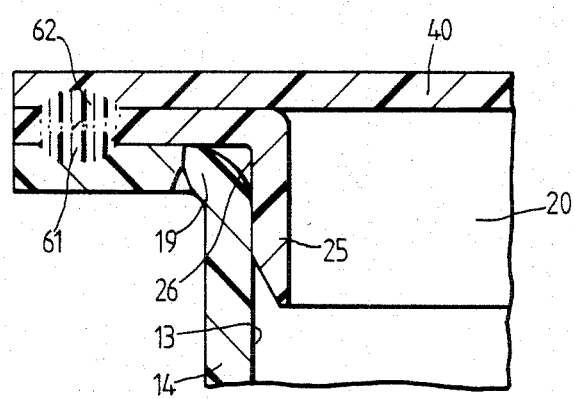

In the location of the weakening zone 17 shown in FIGS. 1d–h the lid 40, the connection device 20 and the orifice section of the container body form after the original sealing of the container a unit (cf FIG. 1f). In the opening of an originally sealed container the outer section of the flange 12 is moved upwards, whereby the connection between the flange and the container body ruptures in the weakened section 17 (cf FIG. 1g). The location of the weakening zone shown, i.e. a location in the flange 12 and inwards of the region where the flange is affixed to the connection device 20, ensures that when the container is resealed (cf FIG. 1h), the orifice edge 19 which is formed between the part of the flange 12 attached to the connection device 20 and the downward-facing flange 25 of the connection device when an originally sealed container is opened, is gripped tightly. The resealing device which consists of the lid 40 and the connection device 20 with the attached part of the flange 12 is extremely stable in shape, whereby the risk of involuntary deformation causing undesirable opening or undesirable leakage in the resealed container is minimized. The downward-facing flange 25 abuts during the initial phase of the opening of the container the inner surface of the orifice edge and prevents deformation of the orifice edge portion of the container. This reduces the risk of spillage when the container contains liquid.

Figure 1I:
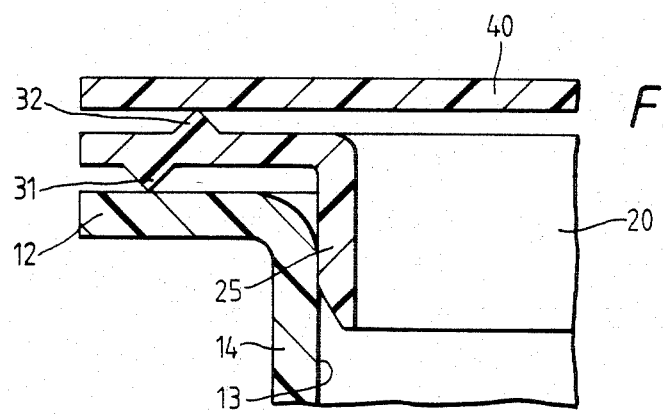

FIG. 1i shows an embodiment of the frame-like connection device 20 in which embodiment the weld indications 31, 32 are displaced relative to one another in relation to the central axis of the container. In the figure the upper weld indication 32 is further shown located on the inside of the lower weld indication 31, but in certain embodiments the location is the opposite. The welding together of the connection device with the flange 12 and the lid 40 takes place in two stages whereby the connection device 20 and the orifice flange 12 of the container body are joined in a separate stage and the connection device and the lid 40 in a separate stage. The order of the two stages can, in accordance with the invention, be selected arbitrarily.

FIG. 1a–i show embodiments of the invention which are suitable for use when the originally sealed container is expected to be exposed to unusually large stress, e.g. mechanical stress. An originally sealed container of the type indicated here is preferably opened with the use of a special tool adapted to the shape and design of the container, but it will be readily realized that such a container can also be opened through the use of a knife or other sharp object.

FIG. 2a–j show an embodiment where the first attachment section 21 of the connection device 20a forms an outer annular region and its second attachment section 22, an inner annular region separated by the downward-facing flange 25. A weakened section 27 formed preferably by a groove 33 is disposed between the weld indication 31 of the first attachment section and the downward-facing flance 25. The figures further show the weld indications 31, 32 disposed on the under-sides 23a,b of the two attachment sections. In certain examples of application the weld indication 32 of the second attachment section 22 is disposed however in the vicinity of the upper-side 24 of the connection device. A gripping device 53 is affixed to the connection device 20 in order to facilitate the opening of the container.

Figure 2D:
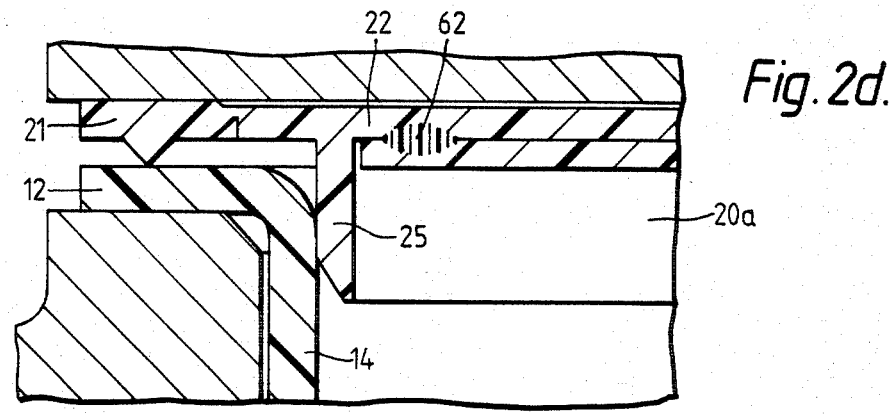
Figure 2E:
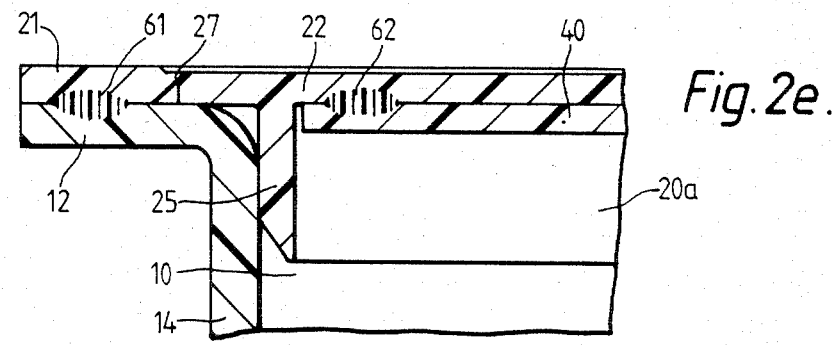
Figure 2F:
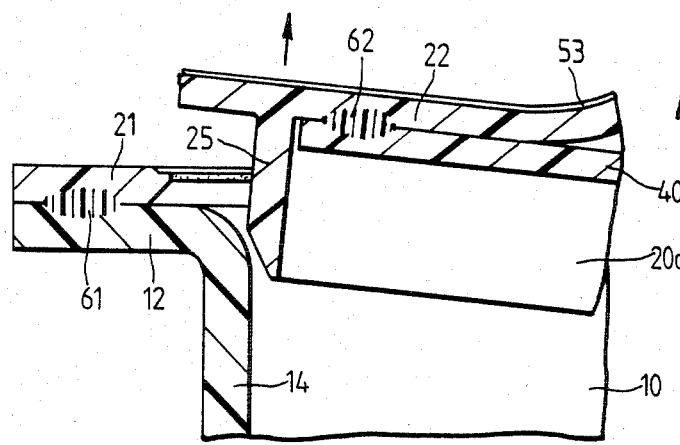
Figure 2G:
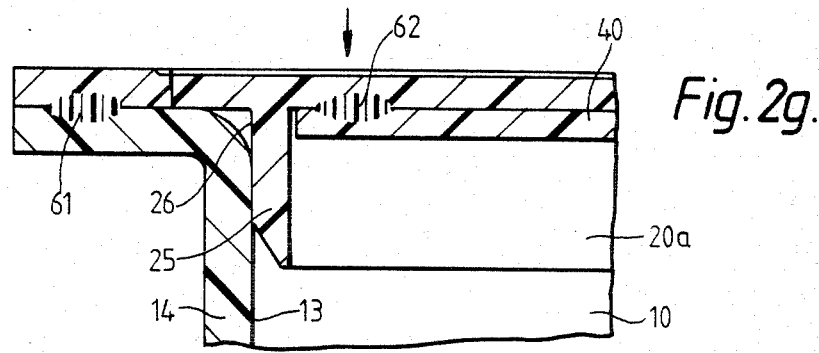
Figure 2H:
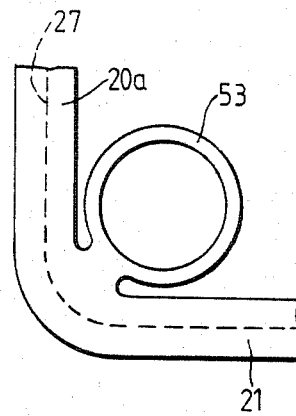

FIG. 2h shows a view from above of the region around part of the orifice edge of the closed container. The location of the gripping device 53 and its connection to the connection device 20a are shown clearly in the figure. The figures 2i–j reveal how the container is opened.

Before the container is filled the connection device 20a is joined to the lid 40 in that the device and the lid are moved towards one another and compressed against one another between the ultrasonic transmitter 50 and the counterhold 51 (cf FIG. 2b). By this means the weld joint 62 is formed and joins together the connection device and the lid in a tight joint to form a unit (cf FIG. 2c). In order to close the container the unit consisting of the connection device and the lid is moved so that it abuts the flange 12 of the container orifice with the downward-facing flange 25 of the connection device protruding downwards into the orifice section of the container body. By means of an ultrasonic transmitter and a counterhold the outer annular flange of the connection device is then joined to the flange 12 of the orifice section by a welding procedure equivalent to that described in conjunction with FIG. 2b. This thus forms the weld joint 61 which in a tight joint joins the connection device 20a together with the lid 40 attached to the connection device, to the container body, whereby the original sealing of the container is concluded. In FIGS. 2a–g the lid 40 is shown as a flat disc, but it is evident to one skilled in the art that the only requirement which is made on the lid with regard to the technology described in this paragraph, is that the shape of the lid should provide the required contact between the connection device 20a and the lid in order to attain the required welding connection.

When an originally sealed container is opened, the container is ripped open in the weakening zone 27, whereby the connection device 20a is divided into the first attachment section 21 which remains affixed to the flange 12 of the container body 10 and thereafter constitutes part of the orifice edge portion (orifice flange) of the opened container, and into the second attachment section 22 with associated downward-facing flange 25 whereby the attachment section 22 remains affixed to the lid 40 (cf FIG. 2f) and thereafter constitutes part of the resealing device (lid) of the opened container. When the container is resealed the resealing device 40, 22, 25 formed by the lid 40, attachment section 22 and the downward-facing flange 25 is moved back to the position prior to opening the container. The outer surface 26 of the downward-facing flange 25 thereby fits tightly against the inner orifice surface 13 of the orifice wall 14 and thus abuts it sealingly (cf FIG. 2g).

FIG. 3a–i show an embodiment where the connection device 20b is disposed with an outer flange 28 and an inner flange 29, which both run all the way round, and joined by a downward-facing portion 30 with an outward-facing surface 37 which runs all the way round. The downward-facing portion 30 forms an acute angle A with the axis of the container. The outer flange thus has its equivalent in the previously described first attachment section 21, and the inner flange has its equivalent in the previously described attachment section 22 of the connection device. The lid 40b is arranged in the vicinity of its outer circumference with an outward-facing flange 41 with an outward-facing surface 48 which runs all the way round. The flange 41 forms an acute angle B with the axis of the container. The angle B is preferably greater than the angle A.

Figure 3A:
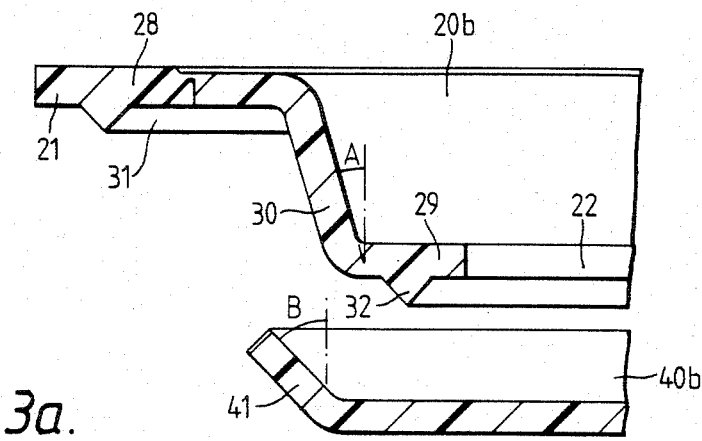
FIGS. 3*a–k* show an embodiment where the attachment sections of the connection device form axially displaced flanges, which run all the way round.
Figure 3B:
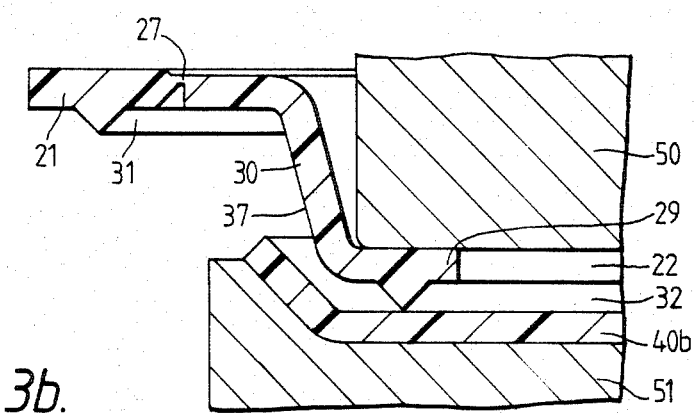
Figure 3C:
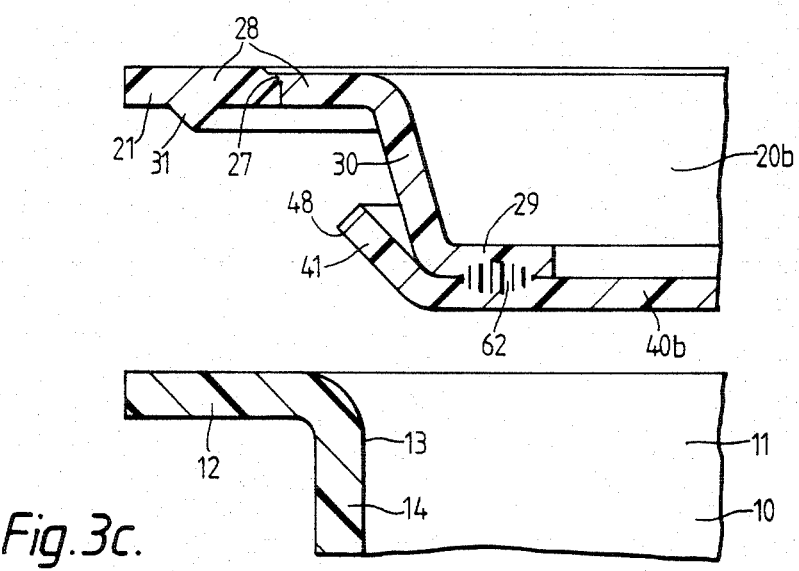
Figure 3D:
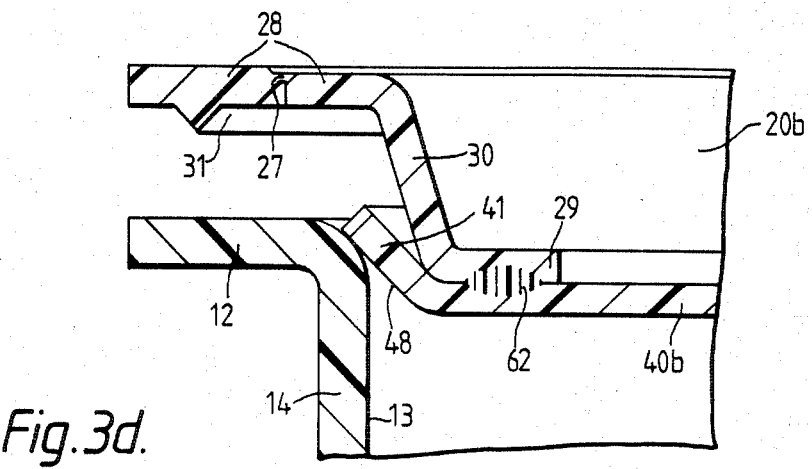
Figure 3E:
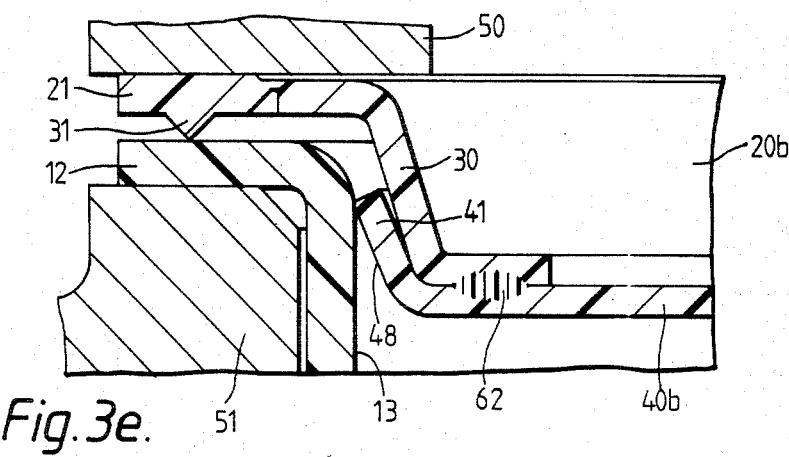
Figure 3F:
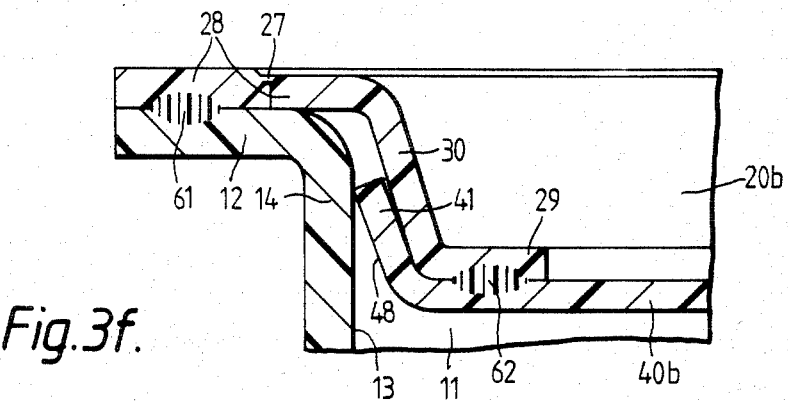

By means of the ultrasonic transmitter 50 the inner flange 29 (the second attachment section) which runs all the way round is joined to the lid 40 in the vicinity of its upper surface (cf FIGS. 3b–c). The unit formed by the connection device and the lid is then moved downwards into the orifice section 11 of the container, after which the outer flange 28 which runs all the way round, is joined to the outward-facing flange 12 of the orifice section 11 by means of ultrasonic welding in a manner equivalent to that which has just been described. In the originally sealed container the upward-facing flange 41 of the lid has thus been moved resiliently against the downward-facing portion 30 between the outer flange 28 and the inner flange 29, by which means the upward-facing flange abuts the inner surface 13 of the orifice section sealingly (cf FIGS. 3d–f).

Figure 2I:
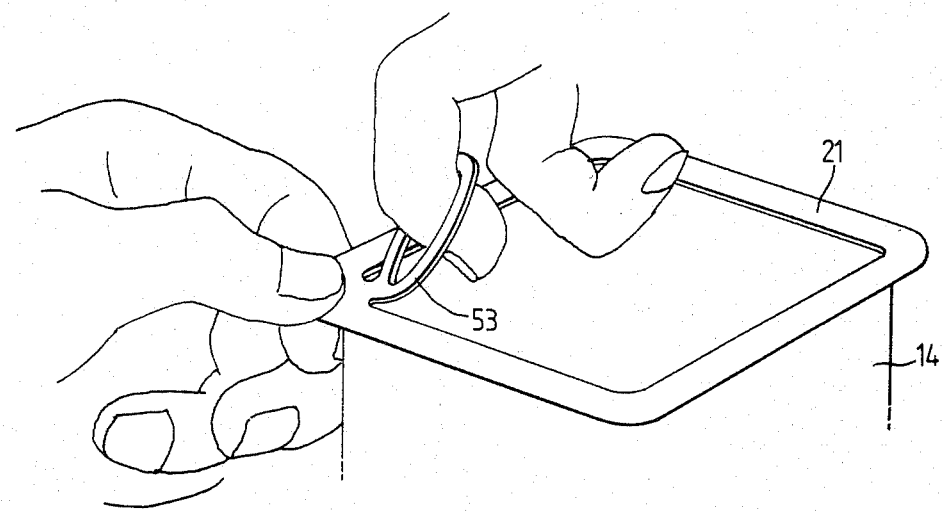
Figure 2J:
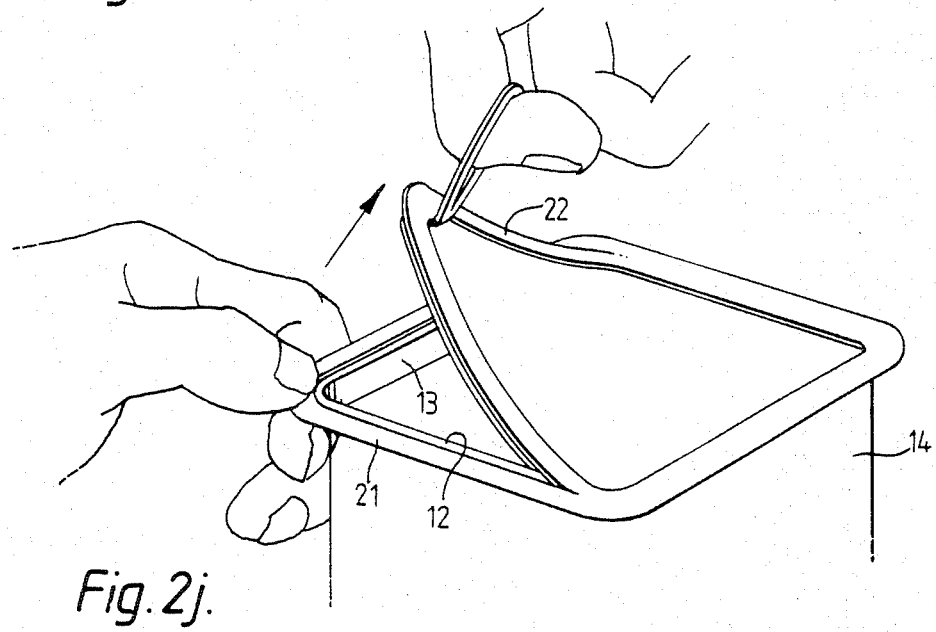
Figure 3G:
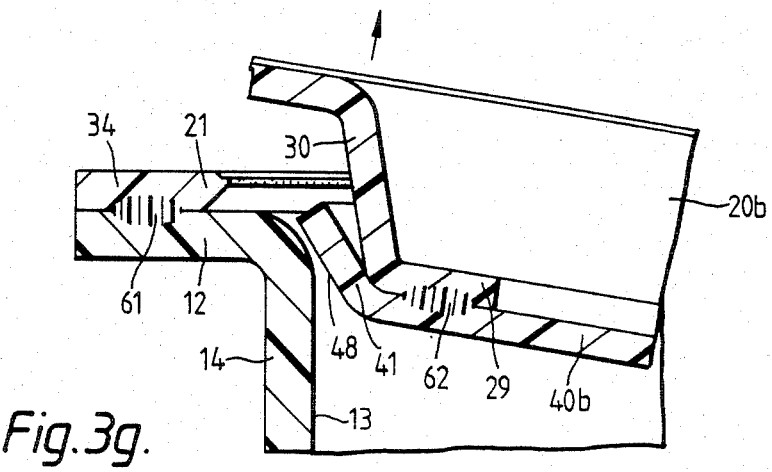
Figure 3H:
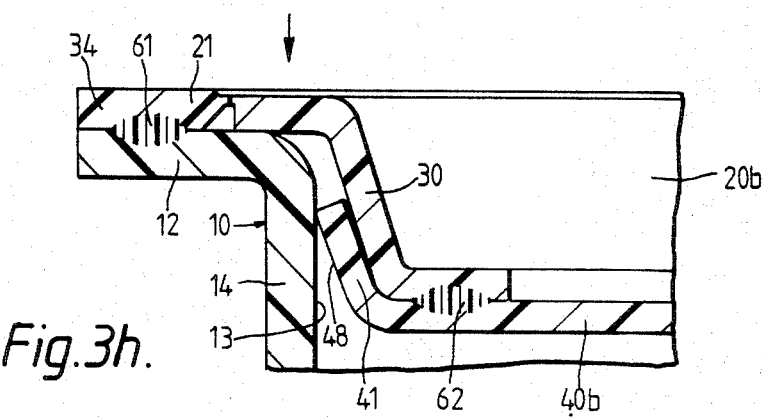
Figure 3I:
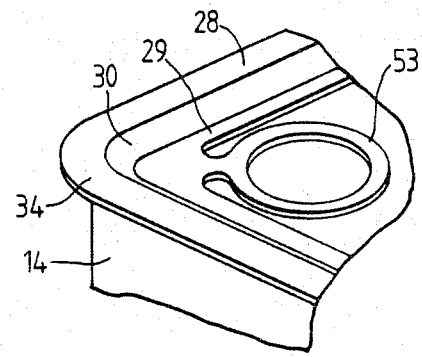

In the opening of an orginally sealed container, the central part of the lid is lifted upwards with the aid of the tongue-shaped gripping device 53 in a manner equivalent to that shown in FIGS. 2i and j, whereby the connection between the central part of the lid and the container body is ruptured in the weakening zone 27 (cf FIG. 3g). An outer part 34 of the outer flange (the first attachment section 21) of the connection device thus remains affixed to the outward-facing flange 12 of the orifice section and thereby forms a dimension-stabilizing reinforcement thereof. In resealing the container the lid is once again moved downwards into the orifice whereby the upward-facing flange 41 of the lid once again springs in against the circumferential surface 37 of the downward-facing portion 30 and thereby abuts the inner orifice surface 13 sealingly by means of its outward-facing surface 48.

Figure 3J:
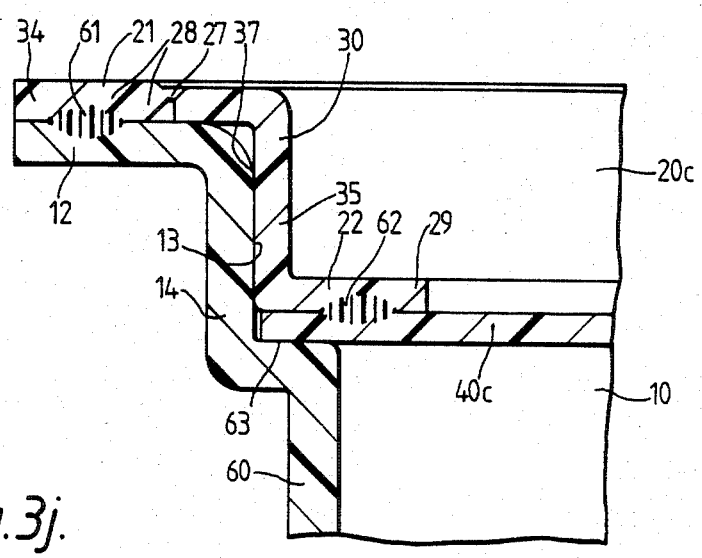
Figure 3K:
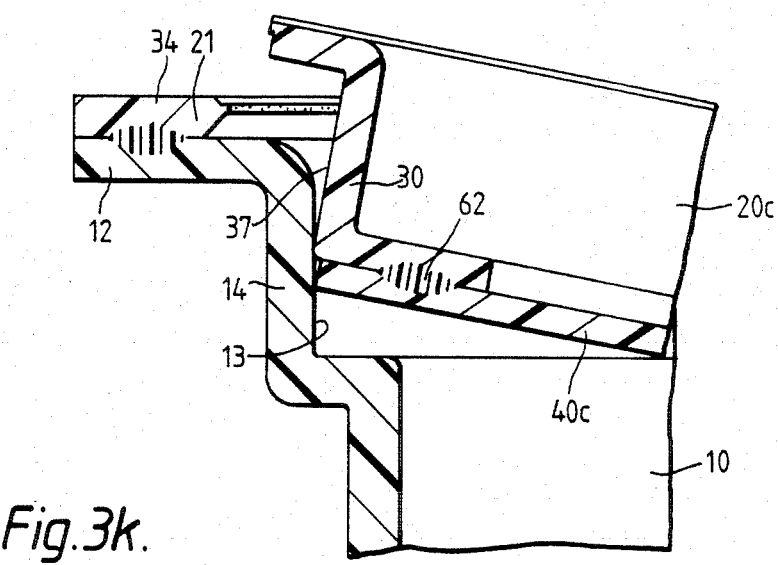

FIG. 3j–k show an alternative embodiment of the connection device 20c where the latter is provided with an outer flange 28 and an inner flange 29, which both run all the way round and are joined by a downward-facing portion 30 against which the lid 40c is affixed by means of the weld joint 62. The connection device 20c is dimensioned in order to fit in the case of a closed container preferably tightly with its outer circumferential surface 37 of the downward-facing material portion 30 against the inner surface 13 of the orifice wall 14 of the container body. The orifice wall 14 is connected to the wall 60 of the container body by means of a ledge 63 which supports the lid 40c and prevents unauthorized rupture of an originally sealed container in the event of downward-acting forces on a lid or connection device. Other reference numbers indicate devices which have direct equivalence in FIGS. 3a–g.

FIG. 3j shows an originally sealed container. The original sealing of the container takes place in accordance with the technology which has previously been described in conjunction with FIGS. 3a–g. FIG. 3k shows a container during opening. By means of a grip in a gripping device 53 (see FIG. 3i) the central part of the connection device 20c together with the lid 40c affixed thereto is lifted. In the originally sealed container the connection is thus ruptured in the weakened section 27. It can be seen from FIG. 3k that an opened container can also be resealed. In those embodiments where the outer surface 37 of the downward-facing material portion 30 fits tightly against the inner surface 13 of the orifice section, the elasticity of the material ensures a tight abutment between the surfaces 37 and 13 respectively, by menas of which the resealing is also tight. The tight fit against the inner surface 13 of the orifice section further ensures good adhesion between the connection device 20c and the orifice surface of the container body which provides the required stability and security against involuntary opening of the resealed container. The ledge 63 contributes towards this, and in combination with the lid 40c ensures high mechanical stability. The remaining attachment section 21 contributes toward giving the orifice section of the opened container high stability.

Figure 4A:
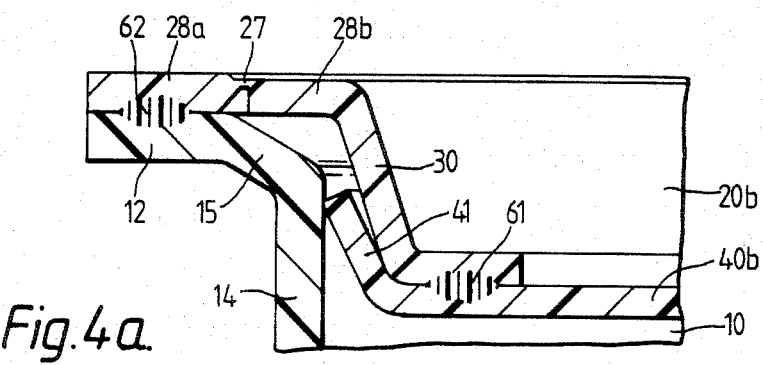
FIGS. 4*a–b* show an embodiment with an oblique transition between the outward-facing flange of the container body and its primarily vertical orifice wall.
Figure 4B:
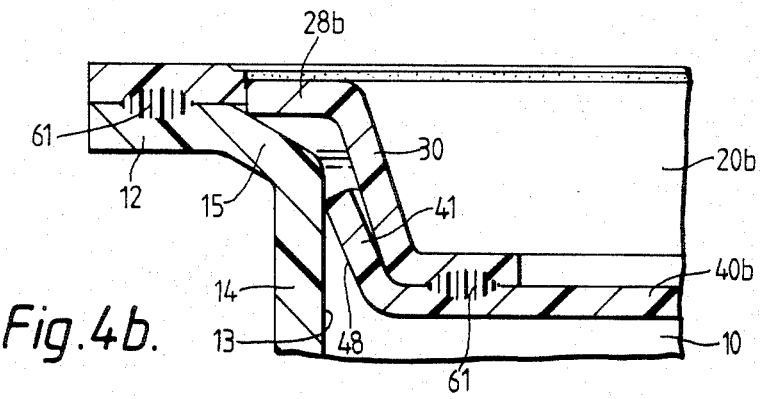

FIGS. 4a–b show an embodiment where the connection device 20 has a design similar to that which has been described in conjunction with FIGS. 3a–i and where the lid has shapes corresponding thereto and where the transition between the primarily vertical orifice wall 14 of the orifice section 14 and the outward-facing flange 12 comprises an oblique portion 15. The weakened section 27 is in the originally sealed container disposed in a region above the oblique portion 15, by which the lid assumes a lower position when the container is resealed than in the case of the originally sealed container. The gap between the circumferential outer flange 28a in the region 28b inwards of the weakened section 27 and the underlying oblique region 15 means moreover that the opening of an originally sealed container can also be initiated in that a pressure is applied to the region inwards of the weakened section 27, by which means the lid ruptures in the weakened section and is gradually moved downwards to a position in which it abuts against the oblique portion 15.

The FIGS. 5a–j show embodiments where the connection device 20d is designed with its second attachment section 22 located outside the first attachment section 21 and projecting beyond the outward-facing flange 2 of the orifice section. The weakened section 27 is moreover disposed mainly in line with the outer delineation surface 16 of the outward-facing flange. The downward-facing flange 25 of the connection device is located inside both the weakened section 27 and the weld indication 31 for engagement with the inner surface 13 of the orifice section. The aforementioned weld indication is located between the weakened section 27 and the downward-facing flange 25.

A first application of the embodiments in accordance with FIGS. 5a-i is shown in FIGS. 5a-d. The order of the combination of the lid 40, the connection device 20 and the container body 10 with each other is now, in a preferred application, the opposite of that previously described. In a first stage the connection device 20d is placed with its first attachment section 21 abutting the outward-facing flange 12 and with the attachment section and the flange located between the ultrasonic transmitter 50 and the counterhold 51. When ultra-sound is applied to the material in the first attachment section during simultaneous motion of the ultrasonic generator and the counterhold towards one another, the weld joint 61 is formed and the connection device 20d is affixed to the container body 10 (cf FIG. 5c). The lid 40 is then brought into abutment with the circumferential outer flange i.e. against the second attachment section 22 and is welded to it in the region of the weld indication 32, whereby the weld joint 62 is formed (cf FIG. 5d).

In a preferred application, the lid 40d (cf FIGS. 5e-j) is designed with an outward-facing flange 42 and a central lid portion 43 located on the inside thereof. In the region between the outward-facing flange 42 and the central lid portion 43 the lid is disposed with a primarily vertical wall portion 45 with an outwardly turned delineation surface 56. An outward-facing bulge 46 is also to be found in the vertical wall portion in the vicinity of its outwardly turned delineation surface 56. The distance between the lower surface 47 of the outward-facing flange 42 and the bulge 46 agrees in principle with the distance between the upper-side 38 of the first attachment section 21 and the lower delineation surface 36 of the downward-facing flange 25 of the connection device (cf FIGS. 5f-i). In the embodiment shown in FIG. 5j the connection device 20f is disposed with an indentation 86 into which the lid bulge 46 in the vertical wall portion 45 snaps upon closure of the container. The container body has a corresponding bulge 87 in its wall 14. Alternatively, recesses facing inwards to the center of the container are disposed in the container wall 14, the connection device 20f and the vertical wall portion 45 of the lid in order to attain a snap action corresponding to that described. It is obvious that the bulges and recesses in certain embodiments are disposed solely along limited portions of the circumference in e.g. the vertical wall portion 45 of the lid. The vertical wall portion 45 comprises, in a preferred embodiment, the outer delineation of a U-shaped transition 57 between the central lid portion 43 and the flange 42 of the lid, whereby the inner delineation of the transition is formed by an inner vertical wall portion 58.

The lid 40 is affixed to the container body provided with the connection device 20 (cf FIGS. 5f-g) in that the under-side of the second attachment section 22 is brought into abutment with an underlying surface 51 after which the lid 40c is brought into abutment with the weld indication 32 of the second attachment section 22. The ultrasonic transmitter 50 compress the outward-facing flange 42 of the lid with its under-side 47 against the weld indication 32 whereby the second attachment section 22 is joined to the lid 40c (cf FIGS. 5f-g), by the formation of the weld joint 61. The lid is moved slightly downwards during welding to the connection device 20d and the bulge 46 snaps in behind the lower delineation surface 36 of the downward-facing flange 25.

Figure 5A:
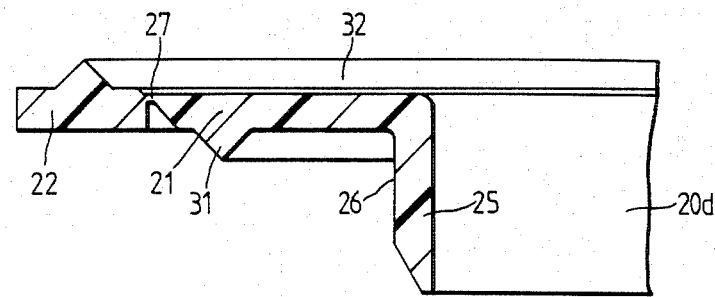
FIGS. 5*a–d* show an embodiment where the weakening zone is disposed outside the region for affixing of the first attachment section to the orifice flange of the container.
Figure 5B:
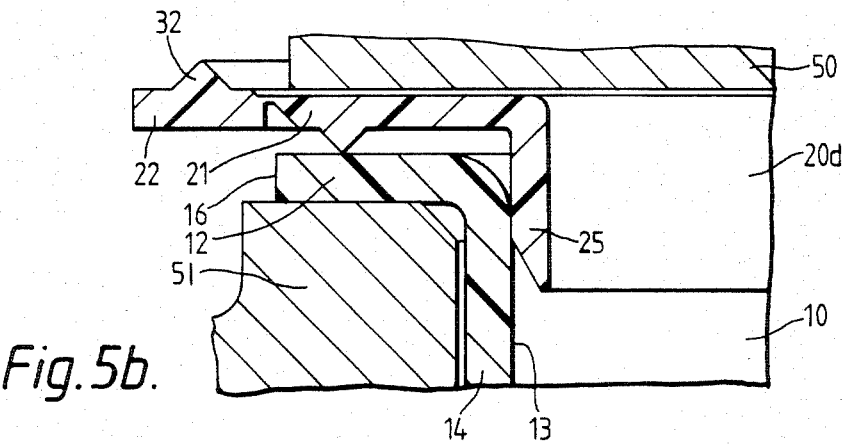
Figure 5C:
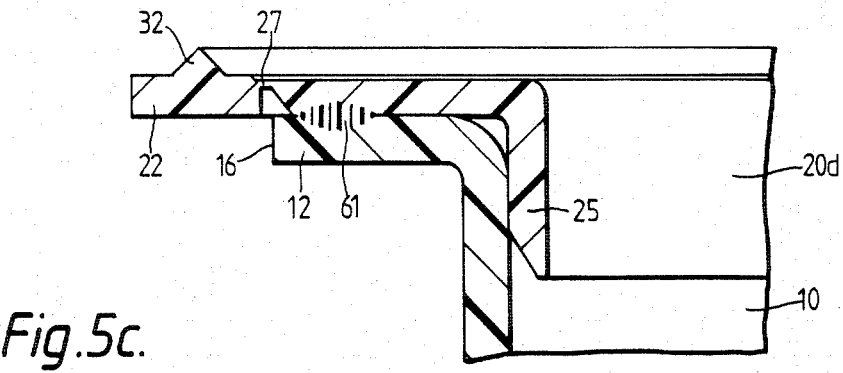
Figure 5D:
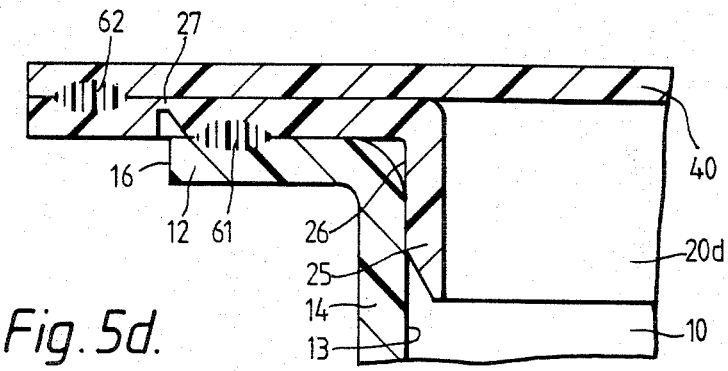
Figure 5E:
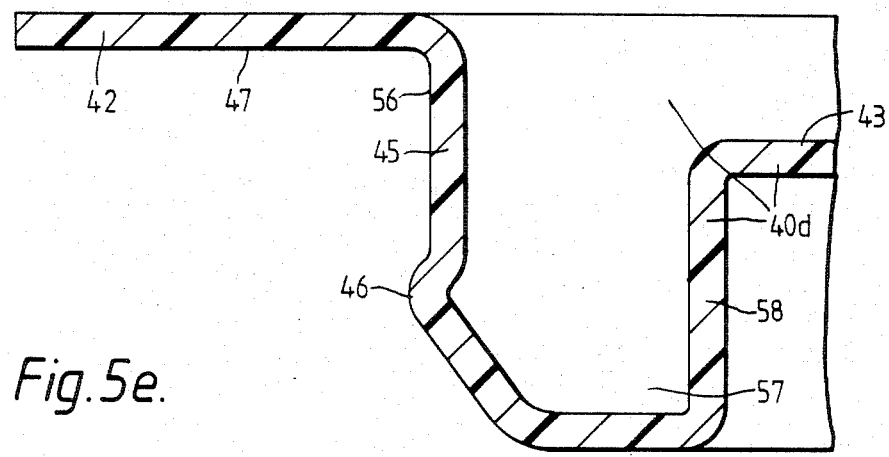
FIG. 5*e–j* show embodiments where the lid is disposed with a bulge for the formation of a snap function with the vertical flange of the connection section.
Figure 5F:
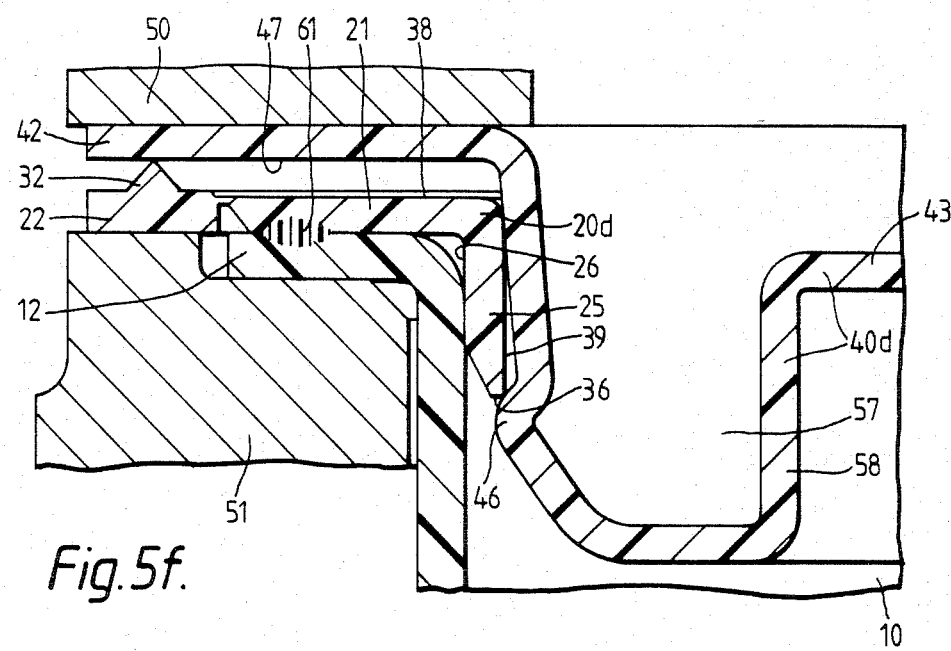
Figure 5G:
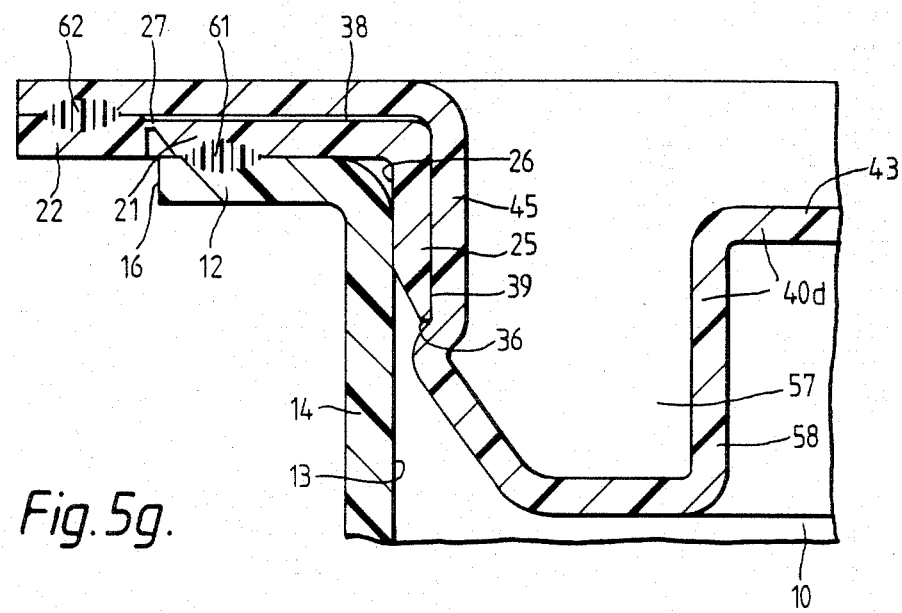
Figure 5H:
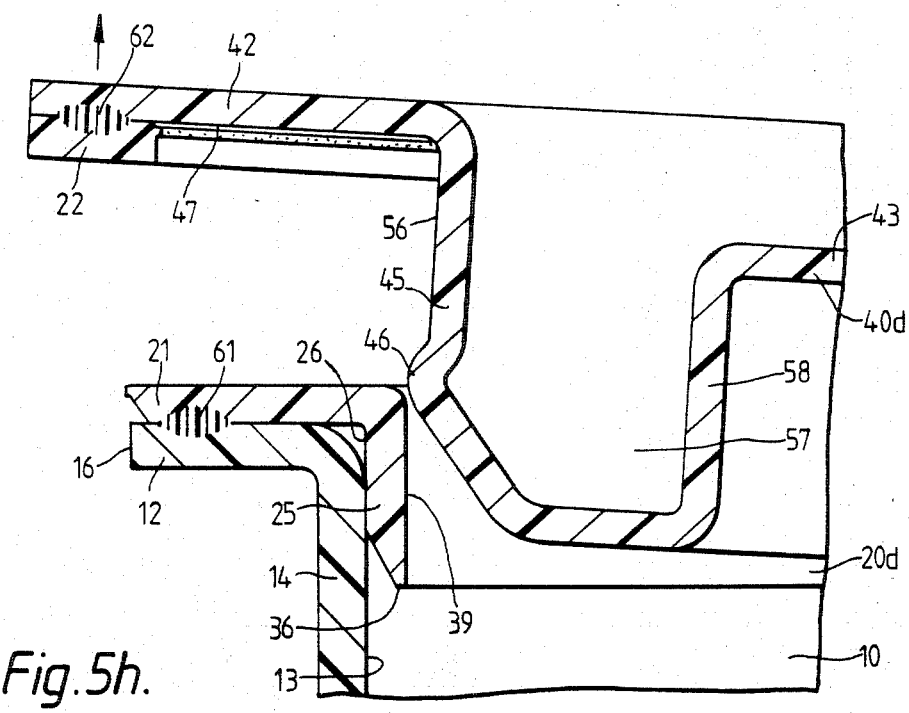
Figure 5I:
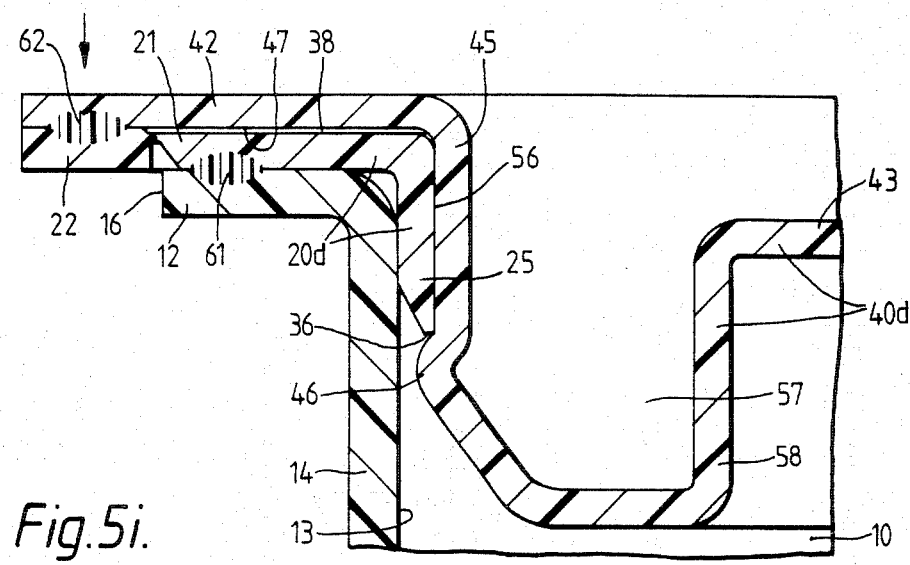
Figure 5J:
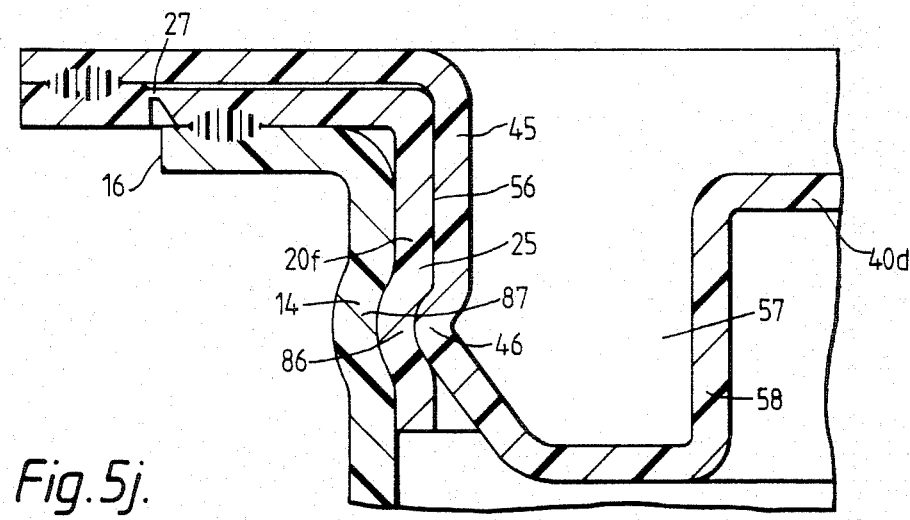

In opening an orginally sealed container, the second attachment section 22 is moved upwards whereby the connection between the second attachment section and the first attachment section 21 is ruptured in the weakened section 27 and the lid 40d with the second attachment section 22 affixed thereto can be removed from the container (cf FIG. 5h). In resealing the container the lid is moved down into the orifice of the container body, whereby the bulge 46 once again snaps in behind the lower delineation surface 36 of the downward-facing flange 25 and thereby affixes the lid to the container body. Due to the resilient force of the material of the lid, the vertical wall portion 45 of the lid is pressed in a direction towards the orifice wall 14 of the container body, whereby the outwardly facing delineation surface 56 of the vertical wall portion sealingly abuts against the inner delineation surface 39 of the downward-facing flange 25.

The construction shown, where a part of the connection device 20d (the second attachment section 22) remains joined to the lid in its outward-facing 42 and the first attachment section 21 as well as the downward-facing flange 25 of the connection device remain joined to the outward-facing flange 12 of the orifice section, ensures that both the lid and the dimensions of the orifce section are stabilized in the opened container, whereby a tight and reliable resealing of the container is achieved.

FIG. 6a-f show embodiments of the invention where the container body orifice section closest to its outward-facing flange 12 has its orifice wall 14 displaced outwards in comparison with the wall 60 of the container body 10a located thereunder.

Figure 6A:
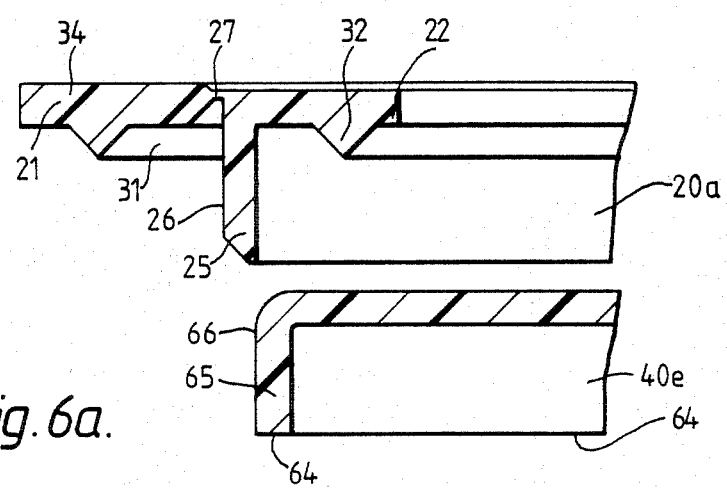
FIG. 6*a–f* show embodiments where the container body is disposed in its orifice section with a ledge for support of the lid when a container is sealed and FIGS. 7*a–c* show examples of utilization of a barrier layer in embodiments of the invention.
Figure 6B:
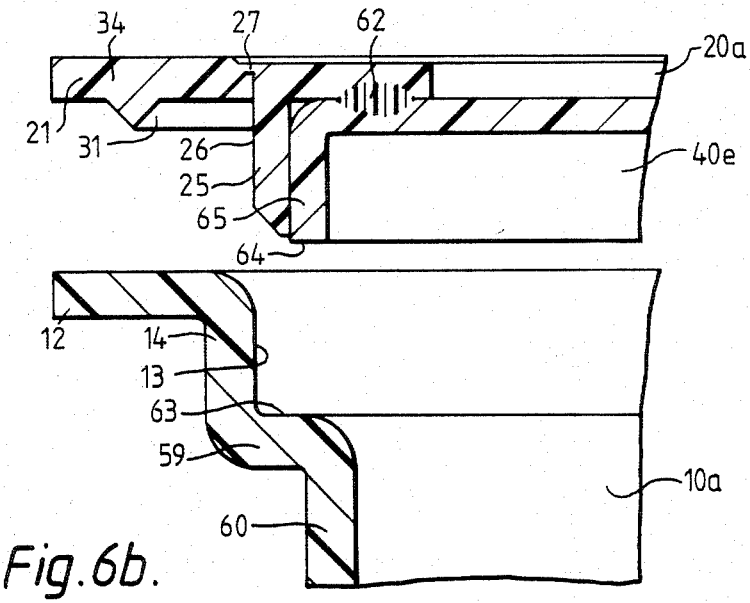
Figure 6C:
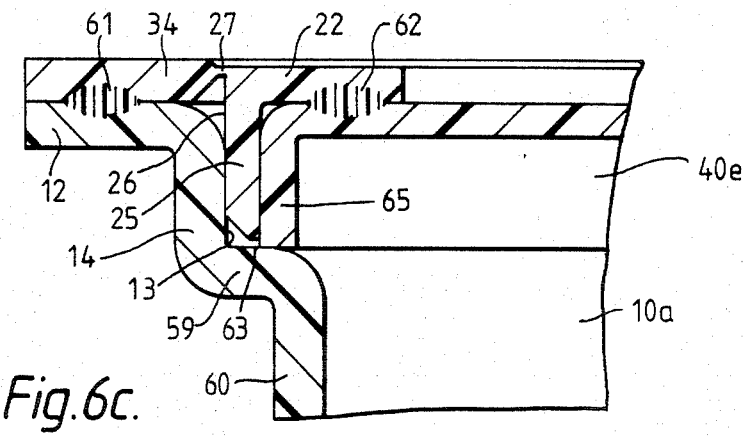

A first embodiment is shown in FIGS. 6a-c where in the transition between the orifice wall 14 and the wall 60 located thereunder, there is found a primarily horizontal wall portion 59 whose upper delineation surface forms an inner ledge 63 in the container body. The ledge is thereby joined to the inner delineation surface 13 of the orifice wall.

The connection device 20a has a design similar to that in FIGS. 2a-g. The device has an outer delineation surface 26 which runs all the way round. The lid 40e is on the other hand disposed with a downward-facing flange 65 which endows the lid with a cup-shaped appearance. The outer delineation surface of the downward-facing flange is seen at 66 and the lower edge surface of the flange at 64.

With application of the technology which was previously described the connection device 20a is joined to the lid 40e when the downward-facing flange 65 is located next to and on the inside of the downward-facing flange 25 of the connection device 20a. The outer delineation surface 66 of the downward-facing flange thereby preferably abuts against the inner delineation surface of the downward-facing flange 25 of the connection device 20a. The combination of connection device and lid is then placed in the orifice of the container body after which by means e.g. of a renewed welding procedure the aforementioned combination is joined to the flange 12 of the container body by the formation of the weld joint 61.

The dimensions of the container body 10a and the combination of the connection device 20a and the lid 40e respectively are so chosen that after joining together the first attachment section 21 of the connection device and the outward-facing flange 12 of the container body the lower edge surface 64 of the downward-facing flange 65 of the connecton device abuts against the ledge 63. This ensures that the originally sealed packaging is protected against unauthorized opening if downward-acting forces are applied to the lid 40e in an area enclosed by the weakened section 27 since (e.g. in stacking filled containers on each other) the forces will be absorbed by the ledge 63.

In opening the originally sealed container, the connection is ruptured in the weakening zone 27 by lifting the connection device upwards and inwards of the weakening zone. As already shown e.g. in FIGS. 2e–j a gripping device, e.g. a tab, an eyelet etc., is normally attached to the connection device in order to facilitate lifting.

In resealing the opening container, the lid 40e together with part of the connection device 20a affixed to the lid is inserted into the orifice of the container until the lower edge surface 64 of the lid once again abuts the ledge 63. The downward-facing flange 65 of the lid provides, together with the part of the connection device 20a affixed to the lid, sufficiently good mechanical stability in order to ensure a sealing abutment between the outer circumferential surface 26 of the downward-facing flange 25 of the connection section and the inner surface 13 of the orifice wall 14 of the container body. The frictional forces between the aforementioned surface in addition ensure that the resealed container cannot be opened involuntarily.

Figure 6D:
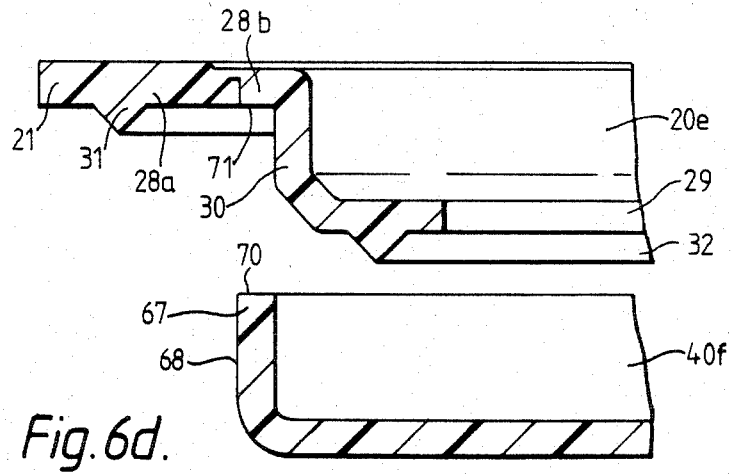
Figure 6E:
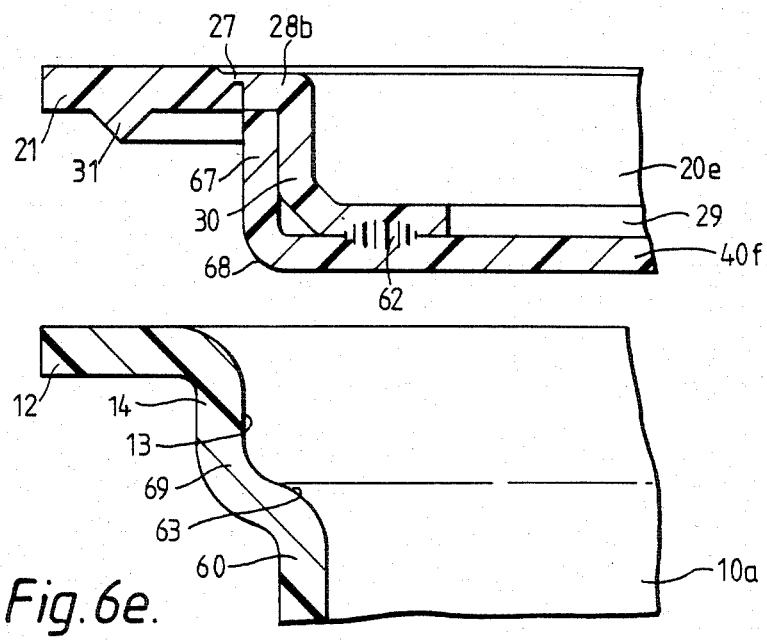
Figure 6F:
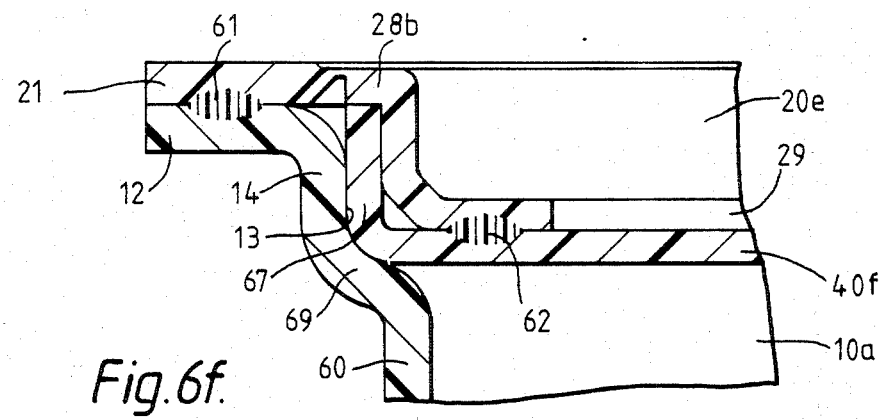

FIGS. 6d–f show a lid 40f with an upward-facing flange 67 corresponding to the downward-facing flange 65 described in conjunction with FIGS. 6a–c. The upper edge surface of the flange is shown at 70 and its outer delineation surface at 68. Here too the lid 40f has a cup-shaped appearance.

The connection device 20e has a design similar to that described in conjunction with FIGS. 3-4.

The container body 10a has a transitional region 69 between the outwardly displaced orifice wall 14 of the container body and the wall 60 located thereunder where the shape and dimensions of the region are adapted to corresponding shape and dimensions of the lid 40f in the region of the transition to the upward-facing flange 67.

The connection device 20e is affixed to the lid 40f and the flange 12 of the container body respectively in accordance with equivalent technology to that described previously. After original sealing the devices assume mutual positions as shown in FIG. 6f. The dimensions of the container body, lid and connecton device are thereby chosen so that the lid 40f abuts the transitional region 69 between the orifice wall 14 of the container body and the wall 60 of the container body located thereunder. By this means there is obtained equivalent security to that described above in conjunction with FIGS. 6a–c against involuntary opening of an originally sealed container as well as corresponding mechanical stability of the design ensuring tight and reliable resealing.

Figure 7A:
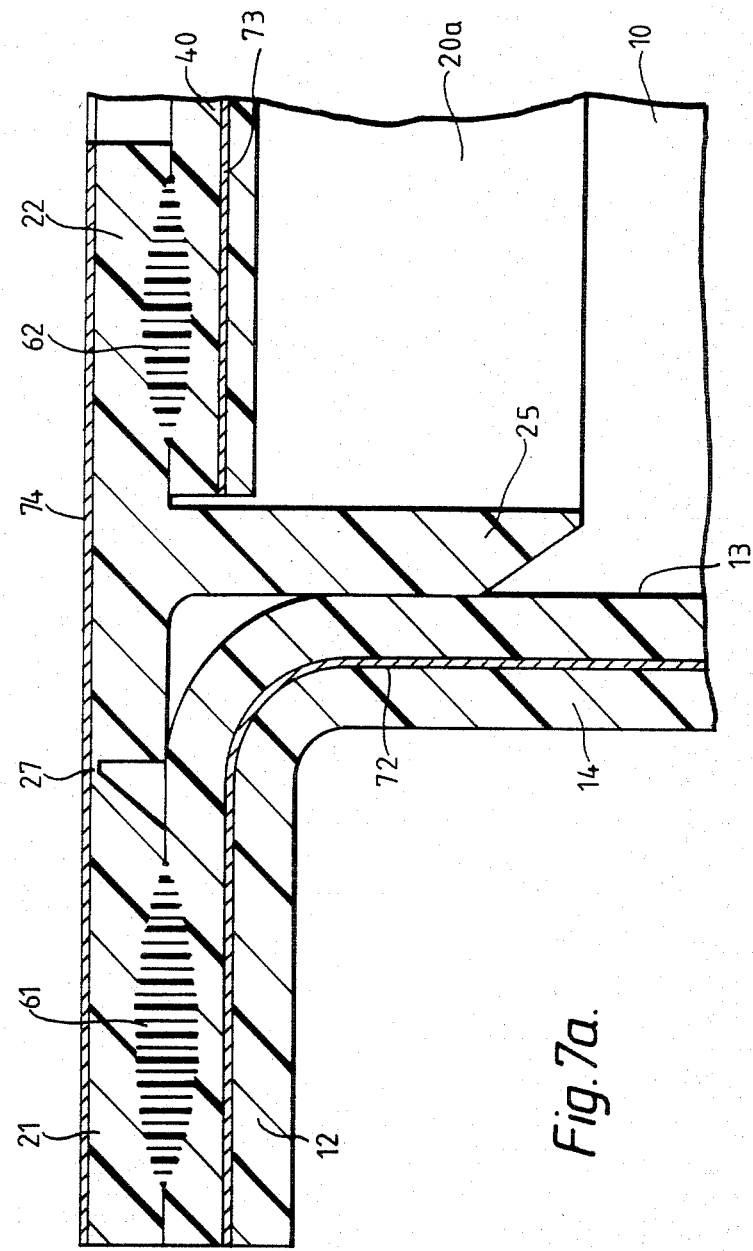
Figure 7B:
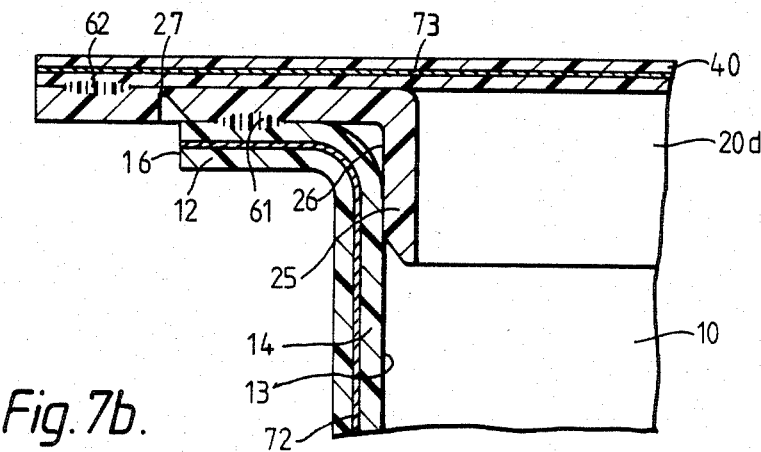
Figure 7C:
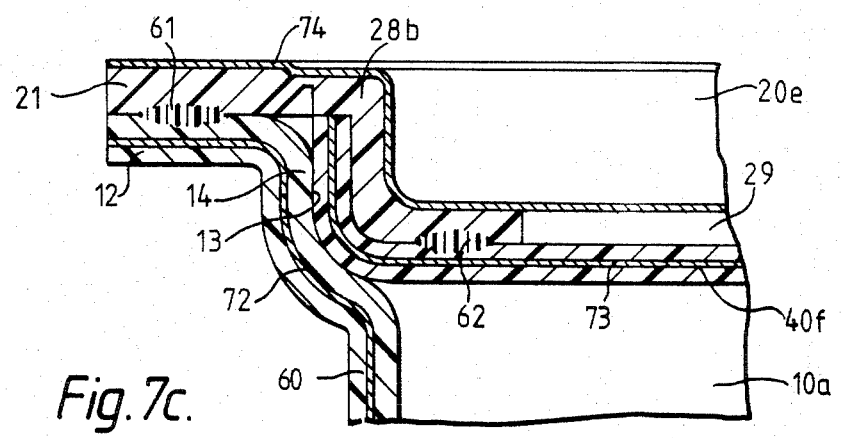

FIGS. 7a–c show embodiments where the invention is applied to containers provided with layers of material in order to improve the barrier properties of the container, i.e. reduce the penetration of oxygen, carbonic acid, water vapor, UV-radiation, etc. The container wall and the lid are provided with enclosed layers 72 and 73 respectively of barrier material. Moreover, the connection device 20a is provided with a surface layer 74 of barrier material which in the closed container forms an outer delineation thereof. The combination of container body, connection device and lid is shown here in embodiments corresponding mainly to those previously revealed in conjunction with the FIGS. 2, 5 and 6, in addition to which the reference characters employed correspond to those which have been used in these Figures. The selected embodiments comprise solely examples of embodiments of the invention which have been provided with layers of barrier material. All previously shown embodiments can naturally be realized with the utilization of barrier layers.

By means of the Figures it is revealed that the barrier layers mainly enclose the entire cavity which is formed in a closed container. In those regions where a barrier layer is absent the penetration routes between the inner and outer surfaces of the container are particularly long, which constitutes acceptable compensation for the absence of a barrier layer.

In certain of the applications, the connection device 20 is shown with a covering layer of barrier material. It is evident to those skilled in the art that such a covering layer can be applied without problems to a connection device once the latter has been produced and that the use of an outer barrier layer does not effect the production procedure for the connection device irrespective of whether the latter is produced by means of injection molding or thermoforming.

Container with barrier layers are produced in accordance with generally employed technology, normally by thermoforming co-extruded laminated films which the barrier layer forms one layer. It is evident that there are difficulties present in achieving equivalents of the previously described weakening zones 27 in conjunction with thermoforming of a container body or a lid. A particular problem is the molding of such weakening zones when the initial material for the molded products comprises laminates containing a barrier layer. Through the utilization of the connection device and by lettng the connection device contain the weakening zone 27, it is thus possible to achieve the required containers with walls containing a barrier layer.

In certain applications it is not desirable for the contents to come into direct contact with the material of the barrier layers. Here too the invention shows examples of solutions (cf FIGS. 7b–c) where the risk of contaminating the contents has been completely eliminated or reduced to an acceptable level.

It is evident from the above description that the utilization of a third component, i.e. the connection device, provide a considerable improvement of previously applied technology, characterized briefly as follows.

1. Optimum welding conditions e.g. in ultrasonic welding.
2. Optimum design of the weakening zone 27 when the latter is formed by means of a weakening notch.
3. Optimum opening function when the connection device is provided with an integrated finger grip or other opening device.
4. Optimum resealing function as the connection device after the opening of the originally sealed container compensates for inaccurate tolerances, insufficient wall thickness etc. and thereby ensure tight resealing.
5. Great freedom in the design of both lid and container body since the connection device eliminates any problems that might arise in the original sealing and/or in resealing the container with the selected design of lid and container body.

By way of conclusion, the invention achieves a container which is hermetically sealed, proof against unauthorized opening, easy to open without using tools, easy to reseal tightly and which allows the use of thermoforming technology even in combination with high-barrier material.

As has already been stated, the invention is described with reference to a number of partial sections in the vicinity of orifice regions of the container in various embodiments of the invention. It is clear that the examples of application shown are in no way dependent on the shape of the container but is applicable to containers which are e.g. round, oval, rectangular, polygonal, etc. It is also evident that the weakening zones 17, 27 disposed for the opening of the container are in certain embodiments not disposed along the entire circumference of the orifice section. For example, in square cross-sections the weakening zones are thus in certain embodiments only disposed around half the circumference and thereby preferably between two diagonally located corners.

I claim:

1. A container comprising a lid, a container body including a flange disposed in fixed position relative to said lid in an originally sealed condition of the container to provide sealed closure of the container, and a frame-like connection member including a first attachment section sealingly affixed to said flange and a second attachment section sealingly affixed to said lid so that the connection member joins the lid to the container body sealingly in the originally sealed condition of the container.

2. A container as claimed in claim 1 comprising a first sealing joint between said first attachment section and said flange and a second sealing joint between said second attachment section and said container body.

3. A container as claimed in claim 2 wherein said connection member is provided with a weakening zone between said first and second attachment sections which is ruptured upon opening the originally sealed container to separate said attachment sections from one another.

4. A container as claimed in claim 3 wherein said first and second attachment sections respectively include sharp projections facing said flange and lid respectively for the formation of weld indications which comprise start regions for said sealing joints by ultrasonic welding.

5. A container as claimed in claim 3 wherein said connection member includes a downwardly projecting flange having an outer surface, said container body having a wall with an inner surface bounding an orifice into which said downwardly facing flange is inserted and whose outer surface tightly abuts against said inner surface of said wall.

6. A container as claimed in claim 4 wherein said first and second attachment sections form ribbon-shaped portions one located radially inwards of the other, said weld indication of the first attachment section being disposed on an under-side of the first attachment section.

7. A container as claimed in claim 6 wherein said second attachment section has upper and lower surfaces, said weld indication of said second attachment section being disposed on one of said surfaces of said second attachment section.

8. A container as claimed in claim 6 wherein said connection member includes an outer flange, an inner flange and an intermediate portion joining said inner and outer flanges, said lid including an upward-facing flange enclosing said inner flange of said connection member as well as at least part of the intermediate portion located next to said inner flange, said upward-facing flange of the lid having an outer surface facing radially outwards of the container which when the container is closed abuts against the inner surface of a wall bounding an orifice in the container body.

9. A container as claimed in claim 8 wherein said weakening zone is disposed between the regions affixing the connection member to said flange and said intermediate portion.

10. A container as claimed in claim 9 wherein said container body includes a wall with an inner surface bounding an orifice which is closed by said lid and connection member, said flange extending radially outwards of said wall, and an oblique portion joining said flange and wall, and having its greatest inner circumference adjacent said flange, said weakening zone of said connection member being disposed in a region above said oblique portion such that when the container is resealed, the lid assumes a position closer to the bottom of the container as compared to its position in the originally sealed container.

11. A container as claimed in claim 3 wherein said weakening zone is disposed radially outwards of said second joint, said lid including an outer flange, a central lid portion and a transitional portion joining said outer flange and said central lid portion including substantially vertical wall portion tightly fitted within said connection member with the container closed.

12. A container as claimed in claim 3 wherein said container body includes an inner ledge below said flange for absorbing forces applied by said lid or connection member inwardly of said weakening zone.

13. A container as claimed in claim 12 further comprising means for snap-engaging said transitional portion of the lid and said connection member upon closure of the container.

14. A container as claimed in claim 13 wherein said means for snap-engaging said transitional portion and said connection member comprises a bulge portion on said transitional portion engageable with said connection member.

15. A container as claimed in claim 3 wherein at least one of said container body and lid comprises a multi-layer material, at least one layer of which comprises high-barrier material.

16. A container as claimed in claim 15 wherein said connection member has a coating of a layer of high-barrier material.

17. A container as claimed in claim 16 wherein said container has an interior for storage of goods and said layer of high barrier material on said connection member is out of communication with said interior of the container.

18. A container as claimed in claim 3 comprising a gripping means adjacent said weakening zone for rupturing said zone.

19. A container comprising a lid member, a body member including a container portion having a cavity adapted for storage of goods, and a radial flange, and a connection member including a first attachment section sealingly affixed to said radial flange and a second attachment section sealingly affixed to said lid member such that the connection member sealingly joins said lid member and body member together with the stored goods sealingly contained in the container portion, one of said members having a weakening zone which can be ruptured to open the container to provide access to said cavity and the stored goods therein.

20. A container as claimed in claim 19 wherein a first of said members includes means for tightly engaging a second of said members upon closure of the container after rupture of said weakening zone whereby to tightly close said cavity.

21. A container as claimed in claim 20 wherein said means which closes said cavity includes a flexible tongue which resiliently and tightly engages said second member.

22. A container as claimed in claim 20 wherein said means which closes said cavity includes means for snap-engaging said first and second members.

23. A container as claimed in claim 19 wherein said first and second attachment sections and said weakening zone are radially displaced with respect to one another.

24. A container as claimed in claim 19 wherein said body member further includes a ledge spaced from said flange for support of one of the other two members.

25. A container as claimd in claim 19 wherein at least one of said members includes a layer of barrier material.

26. A container as claimed in claim 25 wherein said layer is isolated from said cavity.

* * * * *